UNITED STATES PATENT OFFICE.

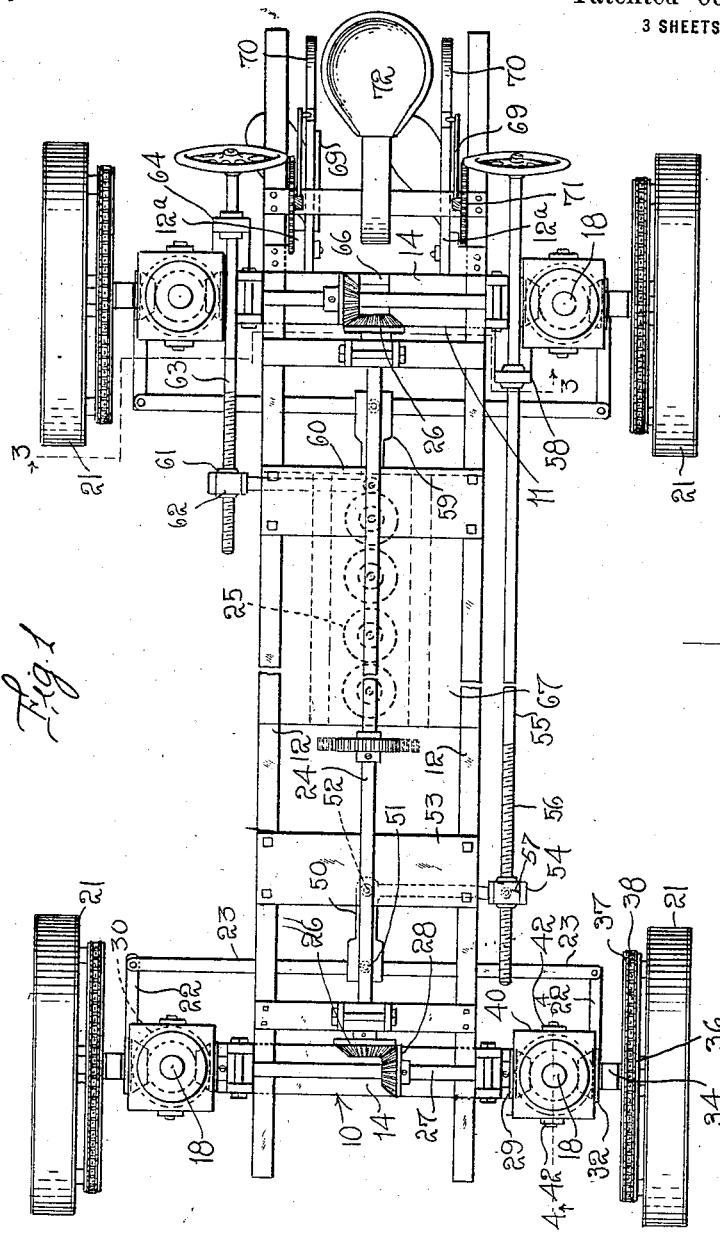

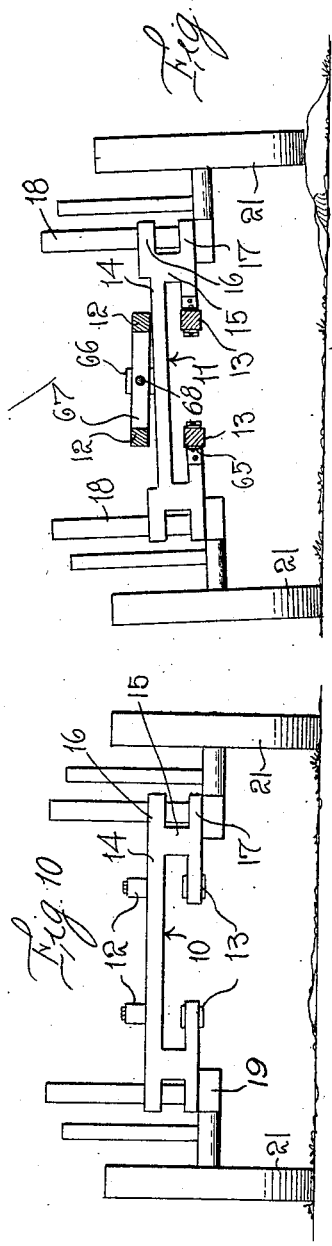

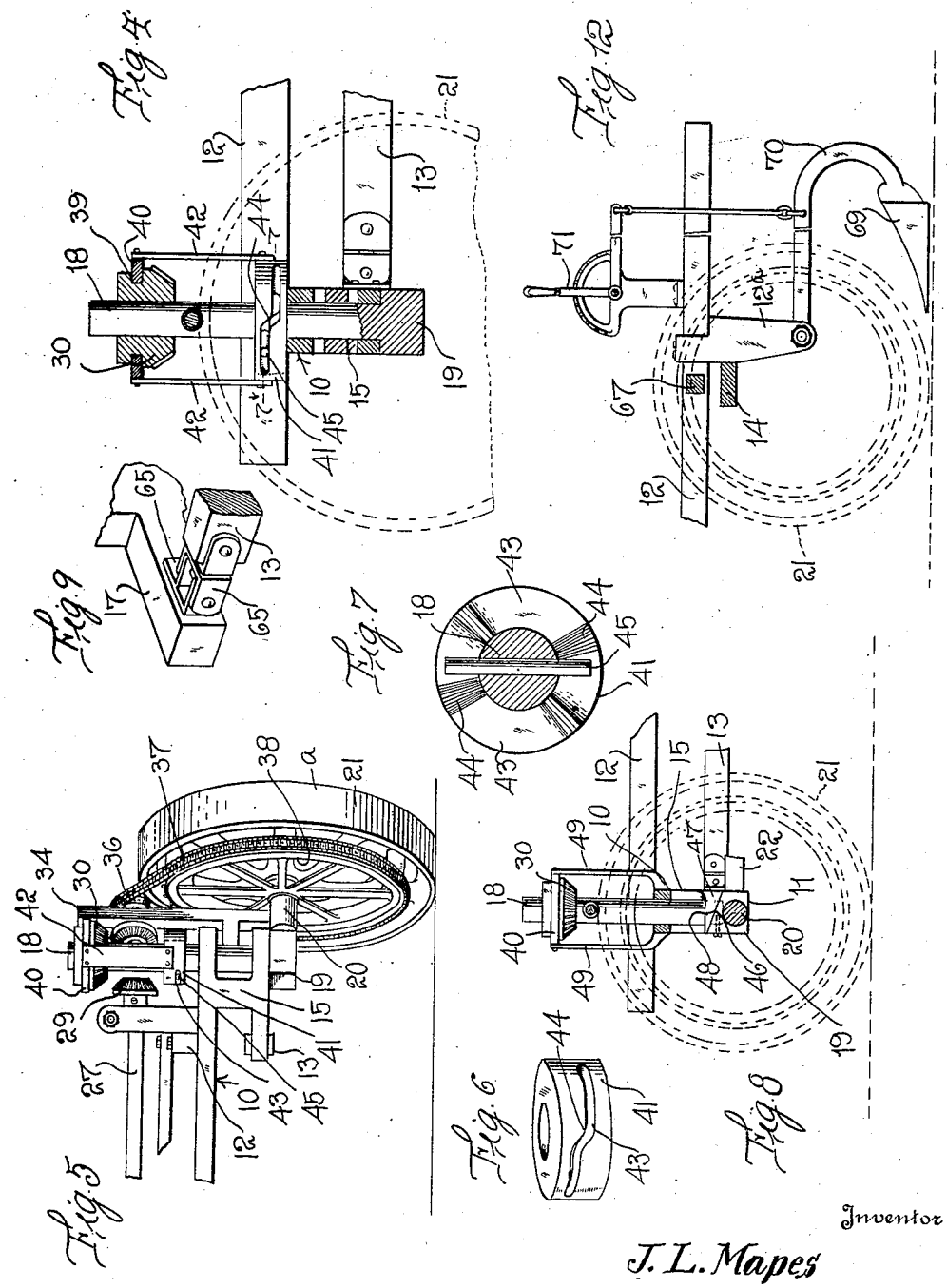
J. L. MAPES.
TRACTOR.
APPLICATION FILED APR. 10, 1918.
1,318,894.
Patented Oct. 14, 1919.
3 SHEETS—SHEET 3.
Inventor
J. L. Mapes
By Watson E. Coleman
Attorney

JAMES L. MAPES, OF NEAR JERSEY SHORE, PENNSYLVANIA.

TRACTOR.

1,318,894.     Specification of Letters Patent.     Patented Oct. 14, 1919.

Application filed April 10, 1918. Serial No. 227,748.

*To all whom it may concern:*

Be it known that I, JAMES L. MAPES, a citizen of the United States, residing near Jersey Shore, but in the county of Clinton, and State of Pennsylvania, have invented certain new and useful Improvements in Tractors, of which the following is a specification, reference being had to the accompanying drawings.

This invention relates to tractors, or like motor driven vehicles, and particularly to tractors designed for farm work and like purposes.

The general object of the invention is to provide a tractor having a four-wheel drive.

A further object is to provide improved means whereby the forward wheels of the tractor may be used as driving wheels, as well as steering wheels, and whereby the rear wheels of the tractor may also be used as driving wheels and be steered, preferably independently of the forward wheels.

A further object is to provide a tractor with power driven steering wheels, so arranged that one wheel of each pair of wheels will be automatically disconnected from its source of power when the wheels are turned to a certain predetermined angle, thereby permitting one of the wheels to describe a relatively short circle, while the other wheel describes a relatively long circle under power.

A further object is to provide a tractor with independently steered forward and rear wheels, so that the tractor is particularly adapted for side hill work.

A further object is to provide an improved steering mechanism for the steering wheels of a tractor of the character described, which will enable the driver of the tractor to independently control the forward and rear wheels in accordance with the nature of the ground for the work to be done.

A further object is to so construct the tractor that the driver is disposed immediately above the plows, cultivators, or other ground engaging devices so that he may, at all times, see the impediments in front of the plows or cultivators, and the manner in which the plows or cultivators are engaged with the ground and may govern the machine accordingly.

Other objects will appear in the course of the following description.

My invention is illustrated in the accompanying drawings, wherein:—

Figure 1 is a top plan view of a tractor constructed in accordance with my invention;

Fig. 2 is a front elevation of the tractor;

Fig. 3 is a section on the line 3—3 of Fig. 1 looking toward the rear;

Fig. 4 is a fragmentary vertical sectional view on the line 4—4 of Fig. 1;

Fig. 5 is a fragmentary perspective view of a portion of the forward arch and the knuckle therefor;

Fig. 6 is a perspective view of the annulus 41;

Fig. 7 is a horizontal sectional view on the line 7—7 of Fig. 4;

Fig. 8 is a like view to Fig. 4 but showing a modified form of lifting cam;

Fig. 9 is a fragmentary perspective view of a portion of an arch and the longitudinal beam showing the connection between the two;

Fig. 10 is a front elevation diagrammatic in character;

Fig. 11 is a section through the rear arch, Figs. 10 and 11 showing together the manner in which the frame is supported in a horizontal position when one of the arches is inclined;

Fig. 12 is a side elevation on a small scale showing the manner of connecting and elevating the plow beams.

Referring to the drawings, it will be seen that the frame of the tractor comprises the front and rear arches 10 and 11, these arches having the same form and being connected by longitudinal members 12 and 13, in a manner which will be later described. Each of these arches consists of a transversely extending portion 14, a downwardly extending portion 15, and the outwardly projecting portions 16 and 17 forming bearings for a vertical spindle 18, the spindle terminating at its lower end in a head 19 having the outwardly projecting stub axle 20, upon which is mounted the wheel 21. The stub axle 20 is preferably, though not necessarily, detachably engaged with the head 19, but it may be formed in any suitable manner.

Carried by the head 19 is a projecting arm 22 to which a corresponding steering rod 23 is pivotally connected. The connection of these steering rods to the steering mechanism will be later described.

As before stated, one of the objects of the invention is to provide means for driving all four wheels simultaneously. To this end, the driving shaft 24, which is operatively connected to the motor 25 in any suitable manner, carries at its forward and rear ends the beveled gear wheels 26. Inasmuch as the driving mechanism for the front and rear axles is exactly the same in each case, and inasmuch as the driving mechanism for any one wheel is the same as the driving mechanism for any other wheel, it is only necessary to describe the driving connections to one of the wheels.

For the purpose of driving each wheel, I provide the relatively short transversely extending shaft 27 carrying upon it the beveled gear wheel 28, meshing with the beveled gear wheel 26 and carrying upon its outer end the beveled gear wheel 29, meshing with a beveled gear wheel 30, which is loosely mounted upon the spindle 18 for free rotation therearound. Mounted upon a stub shaft 31 is a beveled gear wheel 32 which meshes with the beveled gear wheel 30. This stub shaft 31 is carried in a bearing 33 formed as part of the spindle 18 and at its outer end is carried in a bearing formed in a vertical member 34 through the lower end of which the stub axle 20 passes, or which bearing member may be formed as part of the head 19. This member 34 is preferably braced from the spindle 18, between the portions 16 and portions 17 of the arch, by means of the supporting members 35.

Mounted upon the shaft 31 is a gear wheel 36, which is designed to be operatively connected to the traction wheel 21 to drive it, this driving connection being secured by any suitable mechanism, either by directly intermeshing gear wheels (either external or internal) or, as illustrated, by means of a sprocket chain 37 passing over the sprocket wheel 38, carried by the wheel 21. I wish it understood that the showing of the sprocket wheels 36 and 38 and the sprocket chain 37 is purely illustrative and that any other means for securing a driving engagement between the shaft 31 and the wheel 21 may be used.

It will be obvious from the construction above described that power transmitted to the shaft 24 from the engine will be in turn transmitted to the shaft 27 and from thence to the wheel 30 and gear wheel 32 to the shaft 31 and so to the driving wheel or traction wheel 21, and it will be obvious that this driving engagement is secured at all times, without regard to any rotation of the spindle 18 within the arch, inasmuch as the gear wheel 32 can ride around the gear wheel 30 in an obvious manner, so as to permit the wheel 21 to be disposed at any desired angle to the longitudinal axis of the machine.

As before stated, the driving mechanism for the other forward wheel is exactly the same as the driving mechanism for the wheel just described. It is obvious now that when the wheels are turned into a position having angular relation to the longitudinal axis of the machine, the machine will be turned, and that, under these circumstances, one of the wheels will describe a relatively large arc and the other wheel a relatively small arc of movement and, therefore, that the last named wheel should be disengaged from the power shaft, so that it may run free while the power wheel is describing the relatively large arc. To this end I have provided means acting automatically when the wheel $a$, for instance, is turned to a relatively great angle with the axis of the machine, assuming that the machine is turning toward the left, whereby this disconnection between the driving mechanism and the wheel 21 may be secured.

One form of automatic means for securing this disconnection is illustrated in Fig. 4. The beveled gear wheel 30 is formed with an annular groove 39, within which is disposed a yoke or shipper ring 40. Disposed concentrically to the spindle 18 and resting upon the upper face of the portion 16 of the arch is an annulus 41, which is connected by rods 42, or in any other suitable manner, to the shipper ring 40. This annulus is formed with oppositely disposed slots 43, each extending for a portion of its length circumferentially and in a horizontal plane, then downwardly inclined as at 44 and then again longitudinally extended. Projecting from the spindle 18 is a pin 45 which engages in this cam slot 43. The same mechanism is used for the rear wheels as for the front wheels.

Now it will be obvious that as the spindle 18 rotates in a horizontal plane, due to the action of the steering mechanism, the pin 45 will ride in the slots 43. If now this wheel be cramped, that is, the rearmost portion of the wheel turned inward toward the connecting members 13, in the manner illustrated in Fig. 5, the pin will ride in the downwardly deflected portions 44 of the slots 43 and this will cause the lifting of the annulus 41 and through the rods 42 will cause the lifting of the gear wheel 30 so that it becomes disengaged from the gear wheels 29 and 32, thus breaking the operative connection between the driving mechanism and the traction wheel and it will be also obvious that inasmuch as the wheel on the opposite side of the tractor has turned reversely to the wheel which has been cramped, there will be no lifting of the gear wheel 30 on that side and, as a consequence, power will be applied to this gear wheel 30 and the second named wheel will be driven, while the first or cramped wheel will run idle.

I do not wish to be limited to the use of the pin 45 operating in the slots 43 of the annulus 41 and in Fig. 8, I show another means whereby this same result can be secured. In this case, the head 19 on its upper face, near the arm 22 is provided with the upwardly and forwardly extending wedge face or cam face 46 while surrounding the spindle 18 and rotatable thereon is the wedge 47 having an upwardly and forwardly inclined cam face 48, this wedge being carried by the parts 17 of the arch. Now it will be obvious that as the wheel is cramped, the wedge 46 will have wedging engagement with the inclined face 48 and this will act to lift the arch 10, shaft 27 and beveled gear 29 and this bearing against the gear wheel 30 will cause it to be shifted upward on the spindle and thus disengage the gear wheel 30 from the gear wheel 32.

Preferably, however, the portion 16 of the arch is connected by rods 49 to the yoke or shipper ring 40 which engages the gear wheel 30, so as to secure the lifting of the gear 30 without causing any strain upon the shaft 27 and the gear wheel 29. This arrangement is not as good as the arrangement previously described, inasmuch as the whole weight, or at least a large portion of the weight of the tractor, must be lifted upon a rotation of the steering wheel knuckle, whereas in the construction first described no such weight has to be lifted and the only weight resisting the rotation of the parts is the weight of the annulus 41 and of the gear wheel 30.

It will be noted that both in Figs. 4 and 8 I have provided a member having a cam face or inclined face operating against a vertically movable member so that the upper end of the cam or inclined plane is used in both of the sections illustrated in Figs. 4 and 8. For the purpose of steering the forward wheels, I provide a bell crank lever 50 to which the steering rods or links 23 are pivotally connected as at 51. This lever 50 is mounted at the junction of its arms upon a pivot pin 52, extending through or rotatably mounted in a brace or bracket 53 and the outwardly extending arm of the bell crank lever is pivotally connected to a bifurcated or swiveled head 54. Extending downward and forward from the rear end of the machine is a steering shaft 55, screw-threaded as at 56, and engaging with a nut 57 disposed in the bifurcated head 54. The shaft 55 is supported at its upper and rear end by means of any suitable supporting swiveled member 58 and is held from longitudinal movement in a bearing in this member, in any suitable manner. It will be obvious now that by rotating the shaft 55, the bell crank lever 50 may be shifted and that when the bell crank lever is swung in one direction, the steering wheels will turn in a horizontal plane in one direction, and that when the bell crank lever is shifted in the opposite direction, the wheels will be oppositely inclined to the longitudinal axis of the vehicle.

The links or rods 23 for the rear wheels are also pivotally connected to a bell crank lever 59 pivotally mounted upon a suitable support 60, the outwardly projecting arm of the bell crank lever being provided with a swiveled bifurcated head 61, carrying a nut 62, with which the screw-threaded portion of a steering shaft 63 engages, this steering shaft at its rear end being rotatably supported in the swiveled member 64 and carrying a hand wheel or other means, whereby it may be rotated. Thus it will be obvious that the front and rear wheels may be steered independently of each other. This is particularly important, inasmuch as it permits the machine to be turned in a very small radius and also permits the machine to move obliquely with respect to the longitudinal axis of the machine, thus permitting it to readily avoid obstructions. Furthermore, the rear wheels, being steered independently of the front wheels, permit the rear end of the machine to be shifted laterally independently of the forward end of the machine. This is of particular advantage in side hill work, as by this means the rear end of the tractor may be held in proper position on the hill, without the rear wheels tracking after the front wheels. In other words, the rear wheels will not follow the front wheels up the hill, but the machine may be held with its longitudinal axis parallel to the desired path of travel.

It is particularly desirable in a tractor designed for plowing, cultivating and like work, that the rear arch shall be flexibly connected to the forward arch, so that the lifting of any one wheel off of the ground, as by striking an obstruction such as a root or stone, will not cause any other wheel to be lifted off the ground, which would be the case were the front and rear arches rigidly connected.

To this end, the lower pair of beams 13 are connected to the arches at their opposite ends by means of swiveled connections, as illustrated in Fig. 9, these connections comprising the U-shaped clips 65 which are attached to the end portions 17 of the arch, the beams 13 being swiveled to these U-shaped clips 65, as shown in Fig. 9. The upper beams 12 are rigidly connected to the forward arch, but are flexibly connected to the rear arch. To this end, the rear arch is formed with upwardly extending brackets 66, and mounted for rocking movement on these brackets 66 is a supporting member 67 which may be H-shaped in plan view or of any other suitable form, and has trunnions 68 engaging in the brackets 66. The two beams 12 are bolted or otherwise connected to this member 67 and it will be obvious now that the rear arch may be angularly disposed to a horizontal plane, without affecting the horizontality of the beams 12 and it will also be obvious that the beams 13, because of their swiveled connection to the arches, will permit the rear arch to be canted with relation to the forward arch. By this means, when one of the forward wheels strikes an obstruction which acts to raise it, the forward arch will be tilted, the upper beams 12 will be tilted correspondingly, and the platform or support 67 will tilt with relation to the rear arch. Thus three wheels will bear fully upon the ground, even though one of the wheels be lifted. The same result occurs when one of the rear wheels strikes an obstruction and is lifted thereby. If it were not for this flexible connection between the front and rear arches, the lifting of one wheel, as for instance a forward wheel, would cause the lifting of the corresponding rear wheel, or a racking of the frame of the tractor.

While a tractor constructed in accordance with my invention may be used for all purposes for which a tractor is ordinarily used, as for instance for drawing farm wagons, drags, harrows, gang plows, etc., yet where the tractor is to be used for cultivation or plowing, I preferably mount the cultivators or plows upon the longitudinal beams 12. Thus I have shown in the drawings cultivators 69 having beams 70, which are pivoted to the brackets 12$^a$. Any suitable or ordinary means may be used for lifting these cultivators, as, for instance, the operating levers 71 may be mounted upon the uppermost beams or upon the frame in any suitable manner, these levers 71 being operatively connected to the cultivator beams 70 and being held in adjusted position in any usual or suitable manner. Preferably the beams 13 and 12 will extend rearward of the rear arch, and mounted upon the beams 12, rearward of the rear arch, is the seat 72, this seat being so disposed that the driver may conveniently control the steering shafts 55 and 63, and consequently control the adjustment of the plows or cultivators, by means of the levers 71, and, of course, control the engine.

While I do not wish to limit myself to any particular form of motor or engine, an internal combustion engine will ordinarily be used, operatively connected to the driving shaft 24 in any suitable or usual manner. The usual clutches will be provided for connecting or disconnecting the engine to or from the driving shaft and if desired, any arrangement of shifting gear transmission may be used for driving the tractor at different speeds. Under ordinary circumstances, the tractor will have a length between the centers of the wheels of 72 inches and a wheel base of 4 feet, the beams 12 and 13 being spaced apart a distance of about 3 feet. I have not attempted to show the tractor in proper scale in my drawings, inasmuch as this would render certain parts of the device confused.

While I have illustrated the general features of my invention, it will be understood that the details may be varied in many different ways, without departing from the spirit of the invention, as defined in the appended claims.

Having described my invention, what I claim is:

1. In a vehicle, a traction wheel, a knuckle mounted for oscillation in a horizontal plane and upon which the traction wheel is mounted, power transmission mechanism, and means for operatively connecting the power transmission mechanism to the traction wheel and disconnecting it therefrom including a cam, and a member carried by the knuckle and engaging the cam when the knuckle has rotated beyond a predetermined angular position relative to the axis of the vehicle.

2. In a vehicle, a knuckle mounted for oscillation in a horizontal plane, a traction wheel mounted upon the knuckle, a motor, means for transmitting power from the motor to the traction wheel when the traction wheel is parallel to the longitudinal axis of the vehicle or inclined forward and toward the longitudinal axis of the vehicle, and means for operatively disconnecting the traction wheel from the power transmitting means when the knuckle is shifted to carry the traction wheel to a position inclined outward and forward with relation to the axis of the vehicle, said means including a cam member and a member engaging with the cam, one of said members being mounted upon the knuckle and the other being fixed with relation to the knuckle.

3. In a vehicle, a supporting frame, a knuckle mounted for oscillation in a horizontal plane, a traction wheel mounted thereon, means for transmitting power to the traction wheel including coacting gears, and means for shifting the gears out of engagement with each other when the knuckle is turned in a predetermined direction and to a predetermined extent, including a cam member, and a coacting member adapted to bear against the cam member, one of said members being mounted upon the frame of the vehicle and the other upon the knuckle.

4. In a vehicle, an axle, a knuckle swingingly mounted on the axle for oscillation in a horizontal plane, a traction wheel carried on the knuckle, means for transmitting power to the traction wheel including coacting gears, and means for shifting said gears out of engagement with each other upon a rotation of the knuckle in one direction and to a predetermined extent including a cam operatively supported on the axle, a member carried by said knuckle and shifted by the cam.

5. In a vehicle, a pair of traction wheels, a pair of knuckles upon which the traction wheels are mounted, each knuckle having a vertical spindle, a transmission gear wheel mounted upon each spindle for rotation therearound and operatively connected to the corresponding traction wheel, means for transmitting power to said gear wheels, and means for automatically disconnecting that gear wheel having the shorter radius from the power transmitting means upon a turning movement of the corresponding knuckle, including coacting members, one carried by the spindle and the other operatively connected to said gear wheel, one of said members having a cam face with which the other member engages, whereby upon a turning movement to cause an engagement of the cam faces and the shifting of the gear wheel out of its operative position.

6. In a vehicle, a knuckle having a vertical spindle, a traction wheel mounted upon the knuckle for rotation around the spindle, a gear wheel carried by the knuckle and operatively connected to the traction wheel, a gear wheel rotatably mounted upon the spindle and engaging the first named gear wheel, a power driven gear wheel engaging the second named gear wheel, and means acting upon a rotation of the knuckle in one direction, lifting the second named gear wheel out of engagement with the first named gear wheel.

7. In a vehicle, a knuckle having a vertical spindle, a traction wheel mounted upon the knuckle for rotation around the axis of the spindle, a gear wheel carried by the knuckle and operatively connected to the traction wheel, a gear wheel rotatably mounted upon the spindle and engaging the first named gear wheel, a power driven gear wheel engaging the second named gear wheel, means acting upon a rotation of the knuckle in one direction, lifting the second named gear wheel out of engagement with the first named gear wheel, said means comprising a member disposed concentrically to the spindle and vertically shiftable with relation thereto and operatively connected to the second named gear wheel, and a coacting member operatively mounted upon the spindle, and one of said members having an inclined face engageable with the confronting face of the other member upon a rotation of the spindle a predetermined degree to thereby lift said vertically shiftable member.

8. In a vehicle, a knuckle having a vertical spindle, a traction wheel mounted upon the knuckle for rotation around the spindle, a gear wheel carried by the knuckle and operatively connected to the traction wheel, a gear wheel rotatably mounted upon the spindle and engaging the first named gear wheel, a power driven gear wheel engaging the second named gear wheel, means acting upon a rotation of the knuckle in one direction, lifting the second named gear wheel out of engagement with the first named gear wheel, said means including an annulus loosely surrounding the spindle and operatively connected to the second named gear wheel to cause the coincident vertical movement of the second named gear wheel and the annulus, said annulus being formed with a cam track, and a pin carried by the spindle engaging said cam track.

9. In a vehicle, an axle, a knuckle including a spindle mounted in the axle for rotation in a horizontal plane, a gear wheel loosely mounted upon the spindle for rotation in a horizontal plane and having vertical sliding movement on the spindle, a gear wheel operatively supported upon the knuckle for engagement with the first named gear wheel and rotatable bodily around the axis of the spindle and operatively engaged with the traction wheel, a shipper ring engaging the first named gear wheel, an annulus supported upon the axle and loosely surrounding the spindle and operatively connected to the shipper ring, the annulus having a cam track on its inner face extending in a horizontal plane for a portion of its length and then downwardly inclined, and a pin projecting from the spindle and engaging in said cam track.

10. In a vehicle, an axle, a pair of knuckles, each having a vertical spindle extending through the axle and having rotation therein, a transverse power transmission shaft mounted upon the axle and having gear wheels at its opposite ends, a gear wheel loosely mounted upon each spindle and having vertical movement thereon and engaging the corresponding power transmitting gear wheel, a gear wheel operatively supported upon each knuckle and meshing with the corresponding second named gear wheel and operatively engaged with the corresponding traction wheel, and means for lifting each of the second named gear wheels out of its operative position, upon a predetermined rotation of the corresponding knuckle.

In testimony whereof I hereunto affix my signature in the presence of two witnesses.

JAMES L. MAPES.

Witnesses:
FREDERIC B. WRIGHT,
D. W. GALL.

Copies of this patent may be obtained for five cents each, by addressing the "Commissioner of Patents, Washington, D. C."